Nov. 4, 1958  R. H. BROWNE ET AL  2,858,660
MACHINE FOR THE APPLICATION OF REGENERATED
CELLULOSE SEALING RINGS TO
BOTTLES OR THE LIKE
Filed Jan. 16, 1956  8 Sheets-Sheet 1
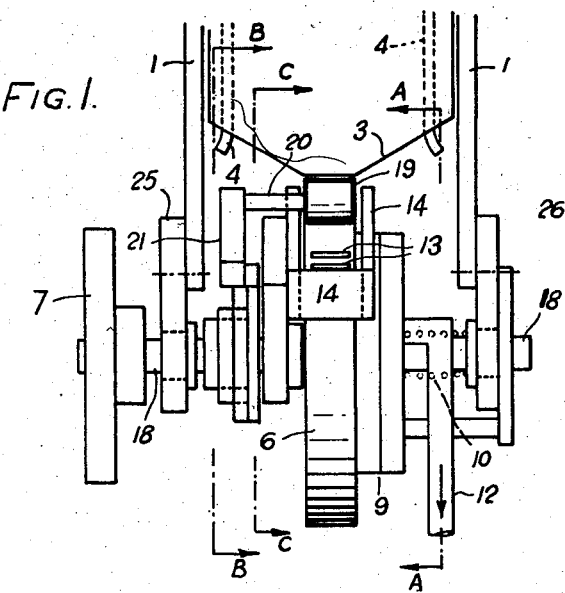
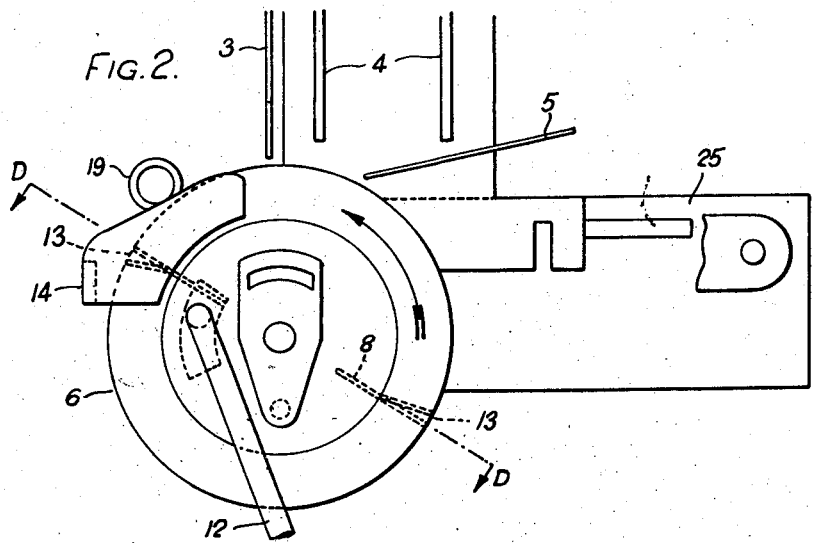
INVENTORS
Reginald H. Browne
Arthur R. Chandler
William E. Storer
Attorneys Nov. 4, 1958

R. H. BROWNE ET AL 2,858,660

MACHINE FOR THE APPLICATION OF REGENERATED
CELLULOSE SEALING RINGS TO
BOTTLES OR THE LIKE

Filed Jan. 16, 1956

INVENTORS
Reginald H. Browne
Arthur A. Chandler
William E. Storer

By Holcomb, Wetherill Brumbaugh
ATTORNEYS

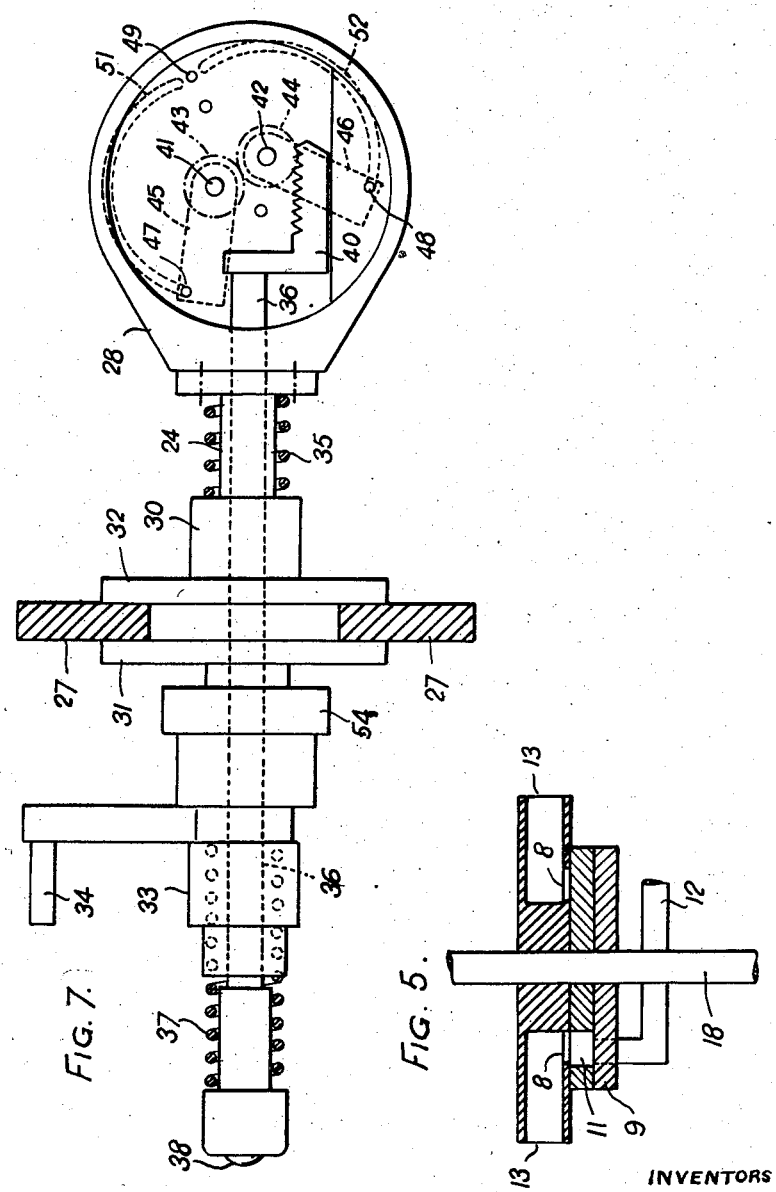

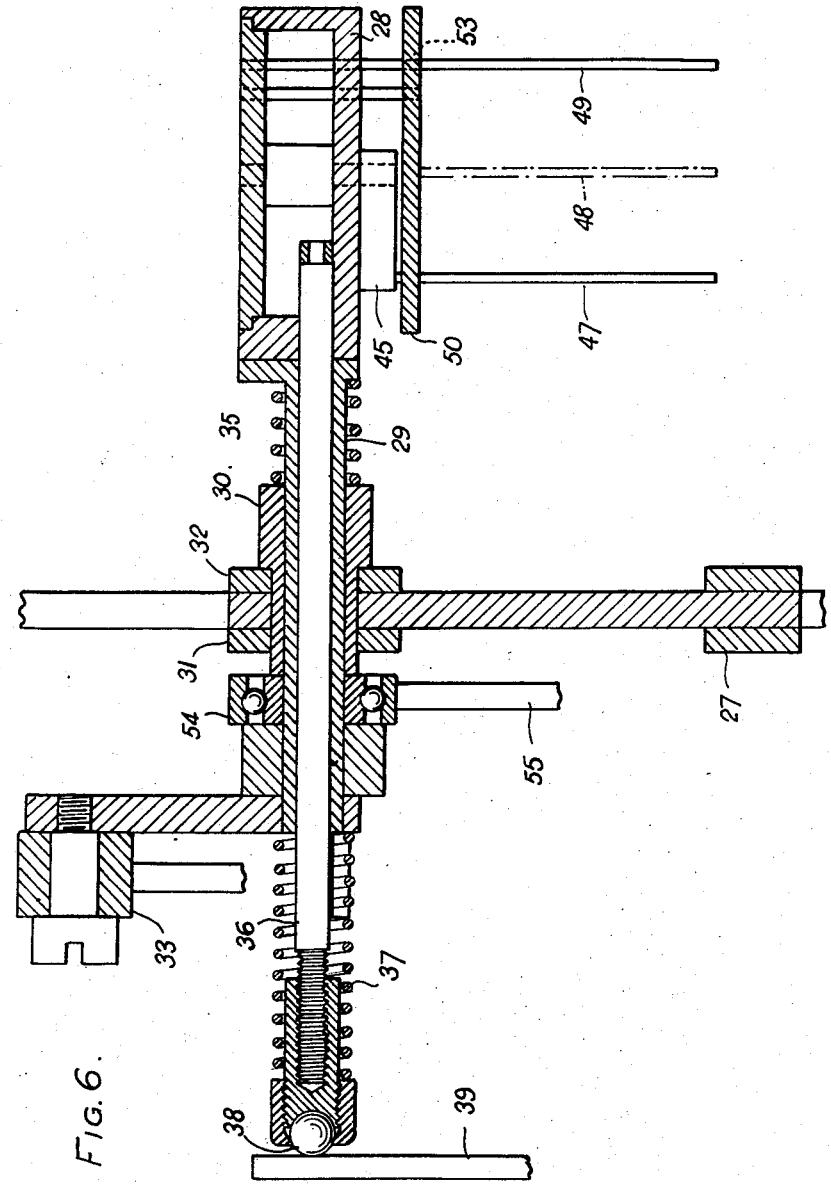

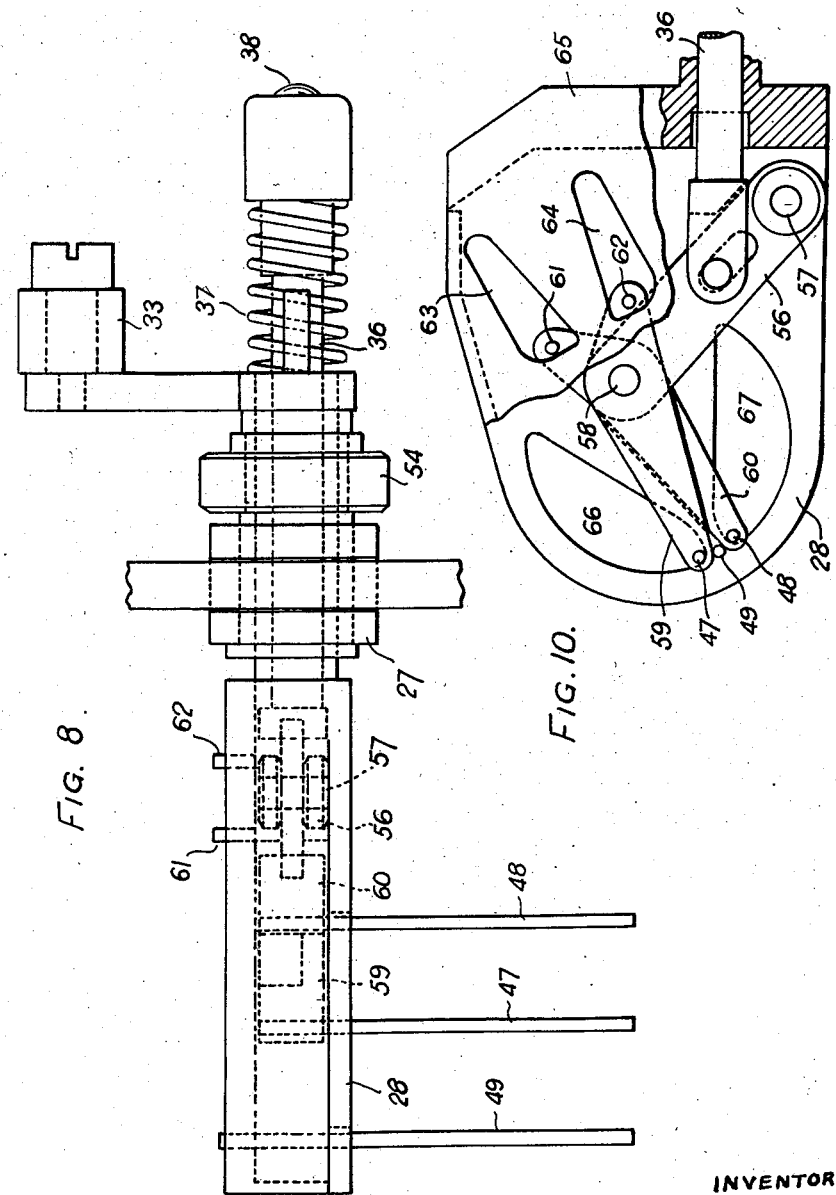

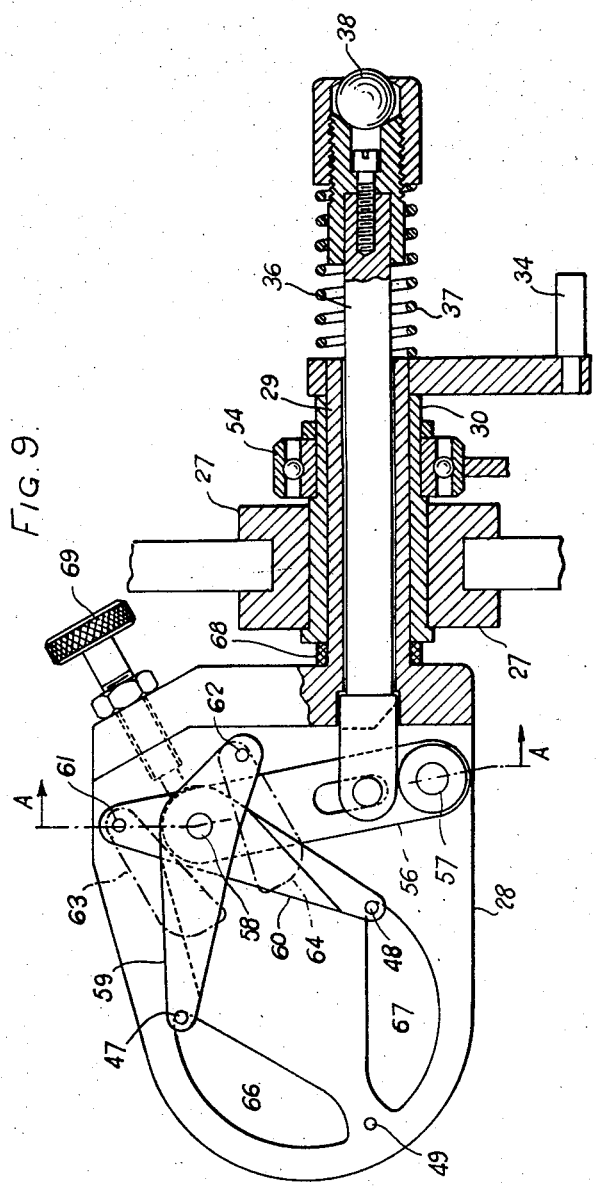

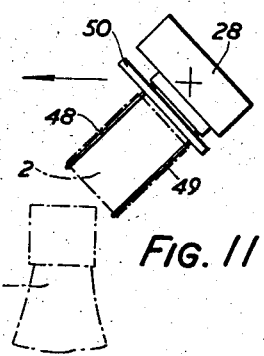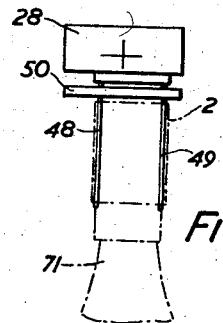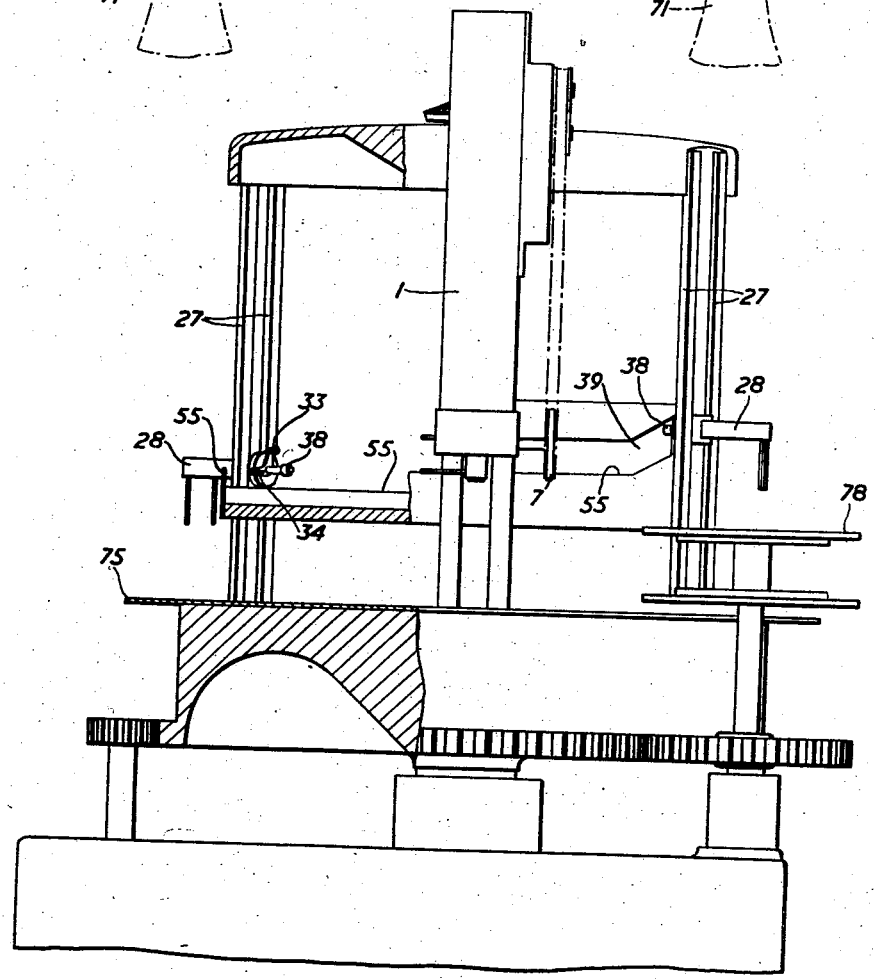

Nov. 4, 1958 R. H. BROWNE ET AL 2,858,660
MACHINE FOR THE APPLICATION OF REGENERATED
CELLULOSE SEALING RINGS TO
Filed Jan. 16, 1956 BOTTLES OR THE LIKE
8 Sheets-Sheet 8

INVENTORS
REGINALD HUNT BROWNE,
ARTHUR ROWLAND CHANDLER
BY WILLIAM ELWOOD STORER
Holcomb, Wetherill & Brisebois
ATTORNEYS

United States Patent Office 2,858,660
Patented Nov. 4, 1958

2,858,660

MACHINE FOR THE APPLICATION OF REGENERATED CELLULOSE SEALING RINGS TO BOTTLES OR THE LIKE

Reginald H. Browne, Upper Killay, Swansea, Arthur R. Chandler, Sketty, Swansea, and William E. Storer, Uplands, Swansea, Wales, assignors to Viscose Development Co. Limited, London, England Application January 16, 1956, Serial No. 559,466

5 Claims. (Cl. 53—291)

This invention relates to a machine of the rotary type for the application of regenerated cellulose sealing rings to bottles or the like. Regenerated cellulose sealing rings are sections from a continous hollow cylindrical length of material and they are applied in the moist extensible condition and when in place are allowed to dry and thereby contract on to the surface of the object.

The invention aims to provide an improved picking up and applying unit or head for a machine for the application of regenerated cellulose sealing rings to bottles or the like, of the type comprising a magazine for collapsed moist regenerated cellulose sealing rings and means for feeding said rings in sequence from the magazine in an opened out condition, in combination with rotary means carrying one or more of our pivotable application units for penetration into and picking up individual opened out sealing rings from the said feeding means and applying the opened out rings to bottles or the like and means for acting upon each such rotating application unit in turn to cause it to pick up a sealing ring, to approach a bottle or the like, to apply a sealing ring thereto and to be withdrawn from the bottle or the like leaving the sealing ring in place thereon.

The machine for which the invention is intended preferably comprises a magazine for the delivery of one moist sealing ring at a time with a folded edge forwards and preferably horizontal and a feeding means comprising a disc to the periphery of which suction can be intermittently applied from the interior and which is mounted for rotation in contact with the lowermost ring in the magazine in a direction towards the axis of the rotary means, an arrester device for holding the top side of the sealing ring while the under side proceeds in contact with the rotating disc whereby the ring is opened out, and guide means for co-operation with the arrester device to lift the opened out ring from the disc while the suction is interrupted.

An application unit embodying the invention preferably comprises a pivotable head having at least three fingers for entering a sealing ring to be applied, said fingers being adapted to collapse alongside one another for entering the ring and leaving the same after application thereof to a bottle or the like and to separate to hold the ring open under tension at the moment of application.

The application unit may comprise three fingers as specified of which two are movable, being operated by reciprocation under cam action of a spring loaded inner shaft of the application unit within a hollow outer shaft thereof, and the third finger is fixed.

In one embodiment of such an application unit the application head end of the inner shaft is cranked and ends in a rack portion with teeth facing a continuation of the shaft axis and meshing with one of two meshing pinions on shafts each having an integral radial arm at the extremity of which one of the movable fingers is perpendicularly mounted.

In an alternative embodiment the application head end of the inner shaft is connected to a pivoted link on which are pivoted a pair of two-armed levers each having one of the movable fingers perpendicularly mounted at one end, guides being provided for said two armed levers so that pivoting of the link by the inner shaft causes collapsing together or separation of the movable fingers.

The latter type of application head may have means for adjusting the degree of pivoting of the link due to the return under spring loading of the inner shaft.

A complete machine according to the invention may therefore comprise a conveyor band, a rotatable platform and infeed and discharge starwheels for transferring bottles or the like from the band to the platform and vice versa, all the said parts being of conventional design, a magazine as specified between the two starwheels, a plurality of application head units rotatable with the platform and within the platform a stationary structure comprising cams for co-operation with corresponding means on the application heads to cause the application heads in turn to approach an opened out sealing ring, fed at a corresponding rate from the magazine, with the fingers substantially horizontal, collapsed alongside one another and projecting forward, to separate the fingers to pick up the sealing ring, to tilt the head to approach a bottle or the like at an angle below the horizontal, to cause the head to drop vertically on to the bottle, to collapse the fingers again, to lift the head from the bottle and to twist it again with the fingers substantially horizontal.

The invention is illustrated in the accompanying drawings in which:

Fig. 1 is a front elevation of a magazine and feeding means for moist regenerated cellulose sealing rings;

Fig. 2 is a vertical section on the line A—A of Fig. 1;

Fig. 5 is a cross section on the line D—D of Fig. 2;

Fig. 6 is a vertical section of one form of an application head unit, the section being taken on the principal axis thereof;

Fig. 7 is a corresponding plan view with the cover removed from the application head;

Fig. 8 is a side elevation of an alternative construction of application head unit; and Fig. 9 is a plan view thereof, partly in cross section, showing the fingers in the open position; and Fig. 10 is a plan view of a fragment similar to part of Fig. 9 showing the fingers in closed position;

Figure 11 is a diagrammatic elevation of an application head, holding a sealing ring, in the position just prior to contact of the ring with a bottle top;

Figure 12 is a similar view to Fig. 11 a moment later, the application head having been pivoted into a vertical position over the bottle top and the ring partly surrounding the bottle top;

Figure 13 is an elevation partly in cross-section showing a rotatable platform with central cam structure.

Figure 4:
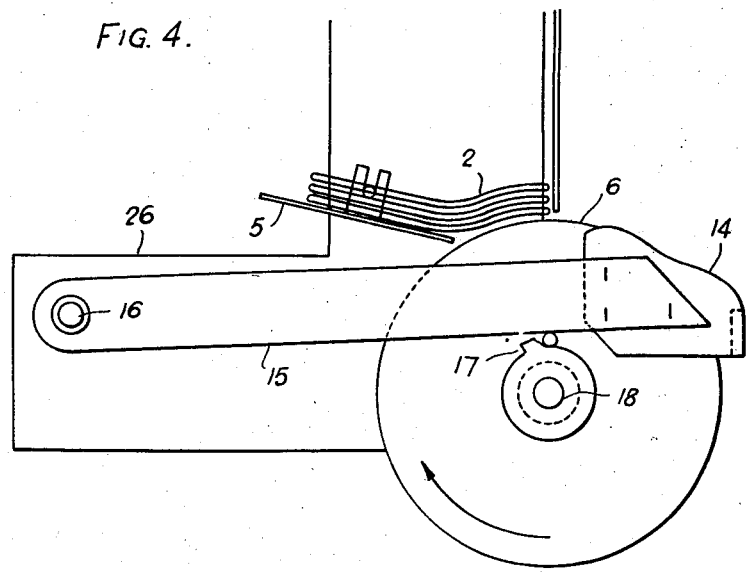
Fig. 4 is a vertical section on the line C—C of Fig. 1, all said sectional views being taken looking in the direction of the arrows in Fig. 1, respectively.
Figure 14:
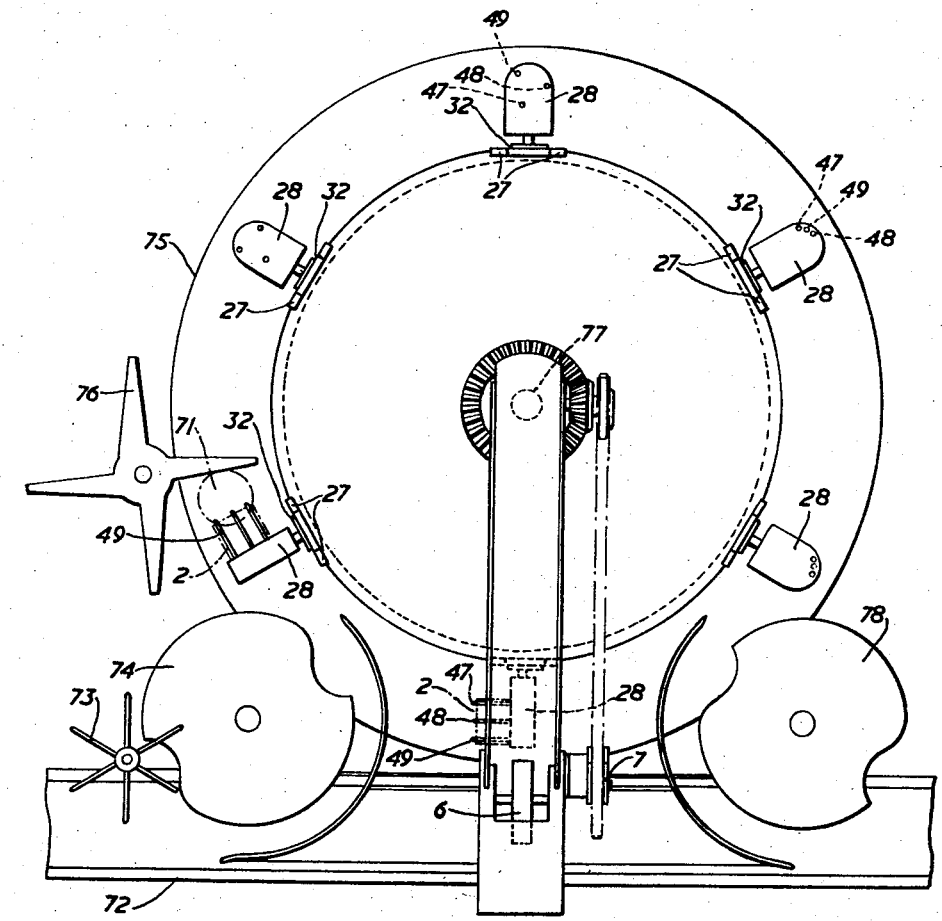
Figure 14 is a plan view showing the platform with conveyor band, intermittent feed gate, infeed and discharge star wheels and positioning gate, all of conventional design.

Referring to the drawings, 1 is the box of a vertical rectangular magazine for moist regenerated cellulose sealing rings 2 (see Figs. 4, 13 and 14). The magazine box has three closed and one open side. Of the closed sides, the two parallel sides, shown in section in Fig. 1, which are fixed, are more or less radial to a horizontally rotatable platform 75 of conventional design and the third side, or back plate, 3, facing the platform, is a plain polished plate which is adjustable in a vertical direction. The parallel sides of the box are fitted with vertical wire guides 4 for positioning the rings, the said guides being adjustable according to the width of the rings, which latter are stacked in the magazine through the open side with their open ends parallel to the fixed sides 1, i. e. with folded edges facing the rotatable platform.

The base of the magazine is partly closed by a bottom rest plate 5 which is inclined downwards towards an opening at the side of the magazine facing the rotatable platform. The opening is itself partly occupied by a portion of the periphery of a selector disc 6 which is mounted for rotation through the sprocket 7 by chain drive from the top of a rotary shaft 77 within the rotatable platform, with the top surface of the selector disc moving towards the platform. The lowermost sealing ring is thus supported in part by the rest plate 5 and in part by the disc 6. The adjustable back plate 3 is spaced apart from the periphery of the selector disc to form a gate which is adjusted to allow the passage of one ring at a time.

One of the plane surfaces of the disc (see Fig. 5) has a plurality of ports 8 into the interior and is lapped in against a rotary valve 9 held up to the disc by a spring 10 and having an opening 11 of suitable size so that as the selector disc rotates the said ports are in turn presented to the said opening. The valve is connected to a vacuum pump through the pipe 12 and the length of the period of suction is established by the length of the opening 11. Spaced around the periphery of the selector disc are suction ports 13 which are individually connected through the interior of the disc to corresponding valve ports, so that in the rotation a period of suction is caused at each suction port in turn.

The timing of the suction relative to the position of the stack of rings can be adjusted by turning the valve on its axis. The periphery of the selector disc is milled to facilitate gripping of the sealing rings.

The selector disc is of considerably less width than the rings to be used and at each side of the top of this disc between the gate and the rotatable platform is arranged a form guide 14, these form guides being mounted as a single unit on an arm 15 (Fig. 4), pivoted at 16, and being held astride but out of contact with the selector disc. The distance between the form guides is also less than the width of the rings to be used. The form guide unit is controlled by a cam 17 mounted on the selector disc spindle 18, which cam can periodically lift the form guides away from the disc.

Figure 3:
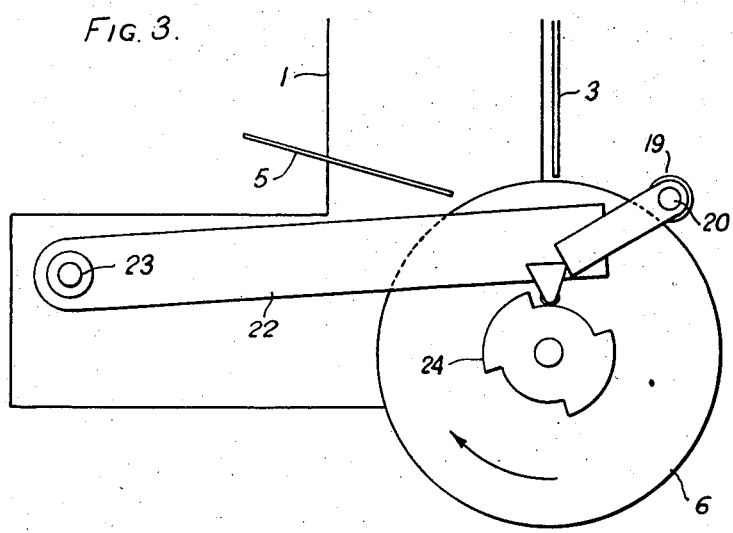
Fig. 3 is a vertical section on the line B—B of Fig. 1.

Between the form guides is an arrester device 19 of rubber, mounted on a journal 20 in an extension 21 of an arm 22 pivoted at 23 and likewise operated by a cam 24 on the disc spindle 17 (Fig. 3) so that it can move towards and away from the periphery of the disc. The cams are adjustable to give the correct timing of the form guide and arrester movements.

The pivots 16 and 23 are on a common shaft mounted in horizontal cheek pieces 25, 26 (Fig. 1) which also carry the magazine and the bearings for the selector disc spindle.

The magazine and feeding means above described are set up between infeed and discharge star wheels 74, 78 for transferring bottles from a conveyor band 72 to the rotatable platform 75 above referred to and vice versa. The conveyor band and star wheels are also of conventional basic design.

Six equally spaced application head units embodying our improvements are mounted for rotation with the rotatable platform and within the platform is a fixed structure comprising a series of cams, some of which are shown in the drawings, for operation in sequence upon the rotating heads in order to effect the movements of the heads which are necessary in the application of the rings to bottle necks. The cam structure can be adjusted for height to accommodate bottles of different sizes.

Referring to Figs. 6–7 of the drawings, each application head unit is mounted radially of the rotatable platform to move vertically between two slipper guides 27 spaced on an inner circumference of the platform. The head units consist of a head proper 28 mounted on the outer end of a hollow shaft 29. The shaft is mounted for pivoting in a bush 30 fitted with two collars 31, 32 one located each side of the slipper guides to prevent radial movement with respect to the platform. A tilt cam roller 33 and a reset cam pin 34 form parts of cranks set at right angles as shown in Figs. 6 and 7, by which pivoting movement of the hollow shaft can be effected for purposes to be described below against loading by the spring 35, the friction being sufficient to prevent too free pivoting movements.

Within the hollow shaft 29 is an inner shaft 36 adapted to reciprocate therein against loading by a spring 37 when a ball swivel 38 meets a push cam 39. The outer end of the inner shaft penetrates the head 28 and is cranked therein, ending in a rack portion 40. The head 28 contains shafts 41, 42 parallel to its axis for two meshing pinions 43, 44. Each pinion shaft protrudes from the casing and has an integral radial arm 45 or 46 having a spring wire finger 47 or 48. A third finger 49 is fixed in the head itself.

Attached to the head 28 is a face plate 50 having two long slots 51, 52 to accommodate the movable fingers and a hole 53 for the fixed finger. The length of the fingers below this plate is approximately equal to the width of the regenerated cellulose sealing ring to be applied.

The hollow shaft 29 has a ball race 54 for engagement by a lift cam 55 for lifting the head unit in the slipper guide 27.

In Figs. 8–10 showing an alternative construction of application head unit, the same reference numerals indicate the same parts as in Figs. 6–7. Referring to Figs. 8–10, however, it is seen that instead of a crank and rack, the head end of the inner shaft is connected to a link 56 pivoted at 57 and on which are pivoted at 58 a pair of two armed levers 59, 60 each having a movable finger 47, 48 at one end and at the other a cam pin 61, 62 guided in a slot 63, 64 in the cover 65 to ensure that the fingers will group together in the closed position as shown in Fig. 10. Slots 66, 67 are provided in the head 28 to allow free movement of the movable fingers. In Fig. 9, 68 is a disc of friction material to control the freedom of the head.

An advantage of the alternative construction is that an adjusting screw 69 can be provided for adjusting the degree of pivoting of the link 56 due to return of the inner shaft under loading by the spring 37. By this means it is possible to control the open position of the movable fingers thereby providing adjustment for the application of different sizes of sealing rings.

The operation of the machine is as follows:

Rotation of the selector disc 6 and vacuum applied at the suction ports 13 thereof result in the withdrawal of the lowermost of the collapsed sealing rings 2 through the gate of the magazine 1. The ring slides forward until it is resting on the form guides 14 in their lower position. The rubber arrester 19 descends towards the periphery of the selector disc and engages the upper side of the ring, thereby holding this side back while the lower side continues to move in contact with the disc, the lower edges of the ring moving up over the form guides. This results in opening out of the ring. The suction is then shut off and the ring is lifted in the opened out condition held between the arrester and the form guides which are raised simultaneously by their cams.

At this moment one of the application heads with the fingers 47—49 together and projecting horizontally in the direction of movement, passes in front of the selector disc and picks up the sealing ring on the fingers. Continued rotary movement of the head causes the ball swivel 38 thereof to pass off the stationary push cam 39 which has been urging the inner shaft 36 against the spring 37 to close the fingers. This results in opening of the fingers so that the sealing ring becomes stretched.

The head continues round the machine and the tilt cam roller 33 meets a stationary tilt cam 70 which pivots the shaft 29 and the head as a whole and thus lowers the angle of the fingers below the horizontal.

At this point a bottle 71 is fed from the conveyor band 72 by way of an intermittent feed gate 73 and the infeed star wheel 74 onto the rotatable platform in front of the head and this bottle becomes held stationary by a positioning gate 76. The neck of the bottle is centralized in the path of the head by means of neck guides. As the head approaches the stationary bottle, the base of the stretched sealing ring engages the bottle cap or stopper and, the head continuing to advance, the pressure of the sealing ring against the bottle causes the head to pivot into a vertical position over the bottle neck as illustrated in Figs. 11 and 12. In doing this, the sealing ring passes over the bottle cap or stopper which becomes partly inserted into the lower open end of the ring.

The positioning gate then releases the bottle which commences to move with the rotatable platform and the head and after it has gone a short distance the lift cam 55 which has been maintaining the height of the head has a sudden step down, allowing the head to drop vertically in the slipper guide 27, thus carrying the sealing ring onto the bottle neck, the under side of the head proper striking the bottle cap or stopper. A stationary reset cam of the central cam structure, acting on the reset cam pin 34, ensures that the head is vertically above the bottle before it drops.

At a further position of the rotatable platform around the machine, the ball swivel 38 meets the commencement of the push cam 39 which closes the fingers, this being rendered possible by the fact that, as regards the construction of head shown in Figs. 6 and 7, the path of each of the movable fingers 47, 48 is an arc which is wholly outside the neck of the bottle or that, as regards the construction of head shown in Figs. 8–10, there is sufficient free movement of the movable fingers to allow of their passing outside the bottle. The head then meets the commencement of the lift cam 55, which raises it again between the slipper guides until the fingers are clear of the sealing ring, which remains in position on the bottle neck.

The bottle is then transferred back onto the conveyor band 72 by the discharge star wheel 78 and the tilt cam roller 33 meets a twist cam which pivots the head to bring the fingers back into the original horizontal position and pointing forward ready to pick up a further ring from the selector disc, which has in the meantime dispensed a ring to each of the other heads in turn.

We claim:

1. In a machine for the application of moist regenerated cellulose sealing rings to bottle tops and the like by successively picking up opened out sealing rings and applying the same to said bottle tops and the like, a combination picking up and applying means for the sealing rings in the form of a pivotable application head unit having at least three parallel fingers capable of occupying a separated position and a position collapsed alongside one another, the separated fingers being adapted, on mechanical lowering of the application head unit, for passage downwards over the bottle top with a sealing ring thereon encircling the bottle top and means being provided for collapsing the fingers while in this position, a path for collapsible fingers from the separated to the collapsed position being provided outside the periphery of the bottle top and the application head unit being adapted for mechanical lifting with the fingers so collapsed, whereby the collapsed fingers are withdrawn from the sealing ring leaving the same in position on the bottle top.

2. In a machine for the application of moist regenerated cellulose sealing rings to bottle tops and the like by successively picking up opened out sealing rings and applying the same to said bottle tops and the like, a combination picking up and applying means for the sealing rings in the form of a pivotable application head unit having three parallel fingers capable of occupying a separated position and a position collapsed alongside one another, the separated fingers being adapted, on mechanical lowering of the application head unit, for passage downwards over the bottle with a sealing ring thereon encircling the bottle top and means being provided for collapsing the fingers while in this position, said means comprising a hollow outer shaft of the application head, a springloaded inner shaft reciprocable therein and means connecting said inner shaft to two collapsible fingers of said three fingers, the third finger being fixed in the application head, a path for the collapsible fingers from the separated to the collapsible position being provided outside the periphery of the bottle top, and the application head unit, being adapted for mechanical lifting with the fingers so collapsed, whereby the collapsed fingers are withdrawn from the sealing ring leaving the same in position on the bottle top.

3. In a machine for the application of moist regenerated cellulose sealing rings to bottle tops and the like by successively picking up opened out sealing rings and applying the same to said bottle tops and the like, a combination picking up and applying means for the sealing rings in the form of a pivotable application head unit having three parallel fingers capable of occupying a separated position and a position collapsed alongside one another, the separated fingers being adapted, on mechanical lowering of the application head unit, for passage downwards over the bottle top with a sealing ring thereon encircling the bottle top and means being provided for collapsing the fingers while in this position, said means comprising a hollow outer shaft of the application head and springloaded inner shaft reciprocable therein, the end of said inner shaft nearer the fingers being cranked and ending in a rack portion with teeth facing a continuation of the shaft axis and meshing with one of two meshing pinions on shafts each having an integral radial arm at the extremity of which one of two collapsible fingers of said three fingers is perpendicularly mounted, the third finger being fixed in the application head, a path for the collapsible fingers from the separated to the collapsed position being provided outside the periphery of the bottle top, and the application head unit being adapted for mechanical lifting with the fingers so collapsed, whereby the collapsed fingers are withdrawn from the sealing ring leaving the same in position on the bottle top.

4. In a machine for the application of moist regenerated cellulose sealing rings to bottle tops and the like by successively picking up opened out sealing rings and applying the same to said bottle tops and the like, a combination picking up and applying means for the sealing rings in the form of a pivotable application head unit having three parallel fingers capable of occupying a separated position and a position collapsed alongside one another, the separated fingers being adapted, on mechanical lowering of the application head unit, for passage downwards over the bottle top with a sealing ring thereon encircling the bottle top and means being provided for collapsing the fingers while in this position, said means comprising a hollow outer shaft of the application head and springloaded inner shaft reciprocable therein, the end of said inner shaft nearer the fingers being connected to a pivoted link on which are pivoted a pair of two-armed levers each having one of two collapsible fingers of said three fingers perpendicularly mounted on one arm, the third finger being fixed in the application head, guides being provided for the other arms of said levers so that pivoting of the link by the inner shaft causes collapsing together or separation of the fingers, a path for the collapsible fingers from the separated to the collapsed position being provided outside the periphery of the bottle top, and the application head unit being adapted for mechanical lifting with the fingers so collapsed, whereby the collapsed fingers are withdrawn from the sealing ring leaving the same in position on the bottle top.

5. In a machine comprising a combination picking up and applying means as claimed in claim 4, means for adjusting the degree of pivoting of the pivoted link due to the return under spring loading of the inner shaft.

References Cited in the file of this patent
UNITED STATES PATENTS

| | | |
|---|---|---|
| 2,103,302 | Strout | Dec. 28, 1937 |
| 2,630,956 | Pomeroy et al. | Mar. 10, 1953 |
| 2,644,628 | Gunter et al. | July 7, 1953 |